US007192502B2

(12) United States Patent
Spatafora et al.

(10) Patent No.: US 7,192,502 B2
(45) Date of Patent: Mar. 20, 2007

(54) METHOD AND DEVICE FOR APPLYING A LABEL TO A PACKET

(75) Inventors: Mario Spatafora, Granarolo (IT); Fabrizio Tale', Bologna (IT); Alberto Polazzi, Rastignano (IT)

(73) Assignee: G.D Societa' per Azioni, Bologna (IT)

( * ) Notice: Subject to any disclaimer, the term of this patent is extended or adjusted under 35 U.S.C. 154(b) by 47 days.

(21) Appl. No.: 10/902,279

(22) Filed: Jul. 29, 2004

(65) Prior Publication Data

US 2005/0082012 A1 Apr. 21, 2005

(30) Foreign Application Priority Data

Aug. 1, 2003 (IT) .......................... BO2003A0471

(51) Int. Cl.
*B32B 37/00* (2006.01)

(52) U.S. Cl. ...................... 156/249; 156/358; 156/556; 156/558; 156/566; 156/567; 156/571; 156/DIG. 3; 156/DIG. 4

(58) Field of Classification Search .......... 156/DIG. 3, 156/DIG. 4, 556, 558, 566, 567, 571, 358
See application file for complete search history.

(56) References Cited

U.S. PATENT DOCUMENTS

| | | | | |
|---|---|---|---|---|
| 4,032,388 A | | 6/1977 | Dunning | |
| 4,394,898 A | * | 7/1983 | Campbell | 198/374 |
| 4,876,839 A | * | 10/1989 | Honda et al. | 53/136.3 |
| 4,895,614 A | * | 1/1990 | Trouteaud et al. | 156/542 |
| 5,019,207 A | | 5/1991 | McCoy | |
| 5,112,430 A | | 5/1992 | Hudson | |
| 5,431,274 A | * | 7/1995 | Schaupp | 198/474.1 |
| 2002/0185232 A1 | * | 12/2002 | Draghetti et al. | 156/543 |

FOREIGN PATENT DOCUMENTS

| | | |
|---|---|---|
| DE | 197 19 420 | 11/1998 |
| EP | 1 186 538 | 3/2002 |
| EP | 1186538 A1 * | 3/2002 |

OTHER PUBLICATIONS

English Abstract of DE 19719 was dated Nov. 19, 1998.

* cited by examiner

*Primary Examiner*—Melvin C Mayes
*Assistant Examiner*—Kim McClelland
(74) *Attorney, Agent, or Firm*—Ladas and Parry LLP

(57) ABSTRACT

A method and device for applying a label to a packet of cigarettes travelling in a given direction along a conveying path; to apply the label to the packet, a pickup head is fed along a feed path by rotating the pickup head about two axes parallel to each other, and by moving the pickup head radially with respect to one of the two axes.

17 Claims, 9 Drawing Sheets

METHOD AND DEVICE FOR APPLYING A LABEL TO A PACKET

The present invention relates to a method and device for applying a label to a packet.

The present invention may be used to advantages for packets of cigarettes, to which the following description refers purely by way of example.

BACKGROUND OF THE INVENTION

Known methods of applying labels to packets of cigarettes comprise feeding the packets of cigarettes along a conveying path and through a labelling station; withdrawing a label from a store by means of a pickup head; feeding the pickup head along a feed path through the labelling station; and applying the label to a respective packet of cigarettes at the labelling station.

Known methods should be capable of conveying each packet and the pickup head applying the label to the packet in such a manner as to prevent relative slide between the packet and label, and ensure a high degree of precision in applying the label. Controlling the movements of the pickup head and packets, however, is extremely difficult, especially when the precision required is considerable.

More specifically, precision is particularly important when the labels in question are revenue stamps, which are cut to form tear lines and are applied to hinged-lid packets of cigarettes. Hinged-lid packets of cigarettes comprise a cup-shaped body, and a lid separated from the cup-shaped body by a parting line; and a label with a tear line should be applied to a hinged-lid packet extremely accurately, so that the tear line corresponds with the parting line. Otherwise, the tear line is superfluous, by not being torn when the packet is unsealed.

Known methods of applying labels are not particularly accurate, and involve the use of relatively complex, high-cost devices which are difficult to control.

SUMMARY OF THE INVENTION

It is an object of the present invention to provide a method and device for applying labels to packets, designed to eliminate the aforementioned drawbacks, and which at the same time are cheap and easy to implement.

According to the present invention, there is provided a method of applying labels to packets, as claimed in Claim 1 and, preferably, in any one of the following Claims depending directly or indirectly on Claim 1.

According to the present invention, there is also provided a device for applying labels to packets, as claimed in Claim 18 and, preferably, in any one of the following Claims depending directly or indirectly on Claim 18.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
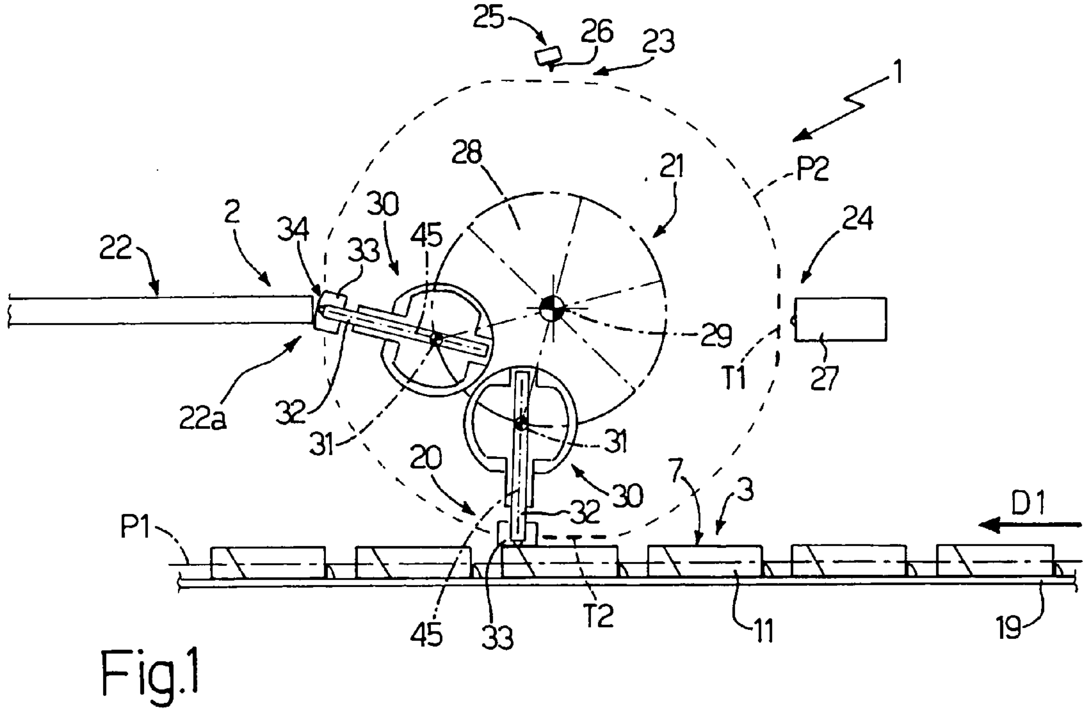
FIGS. 1 to 8 show schematic side views, with parts removed for clarity, of a device in accordance with the present invention in successive operating positions.
Figure 2:
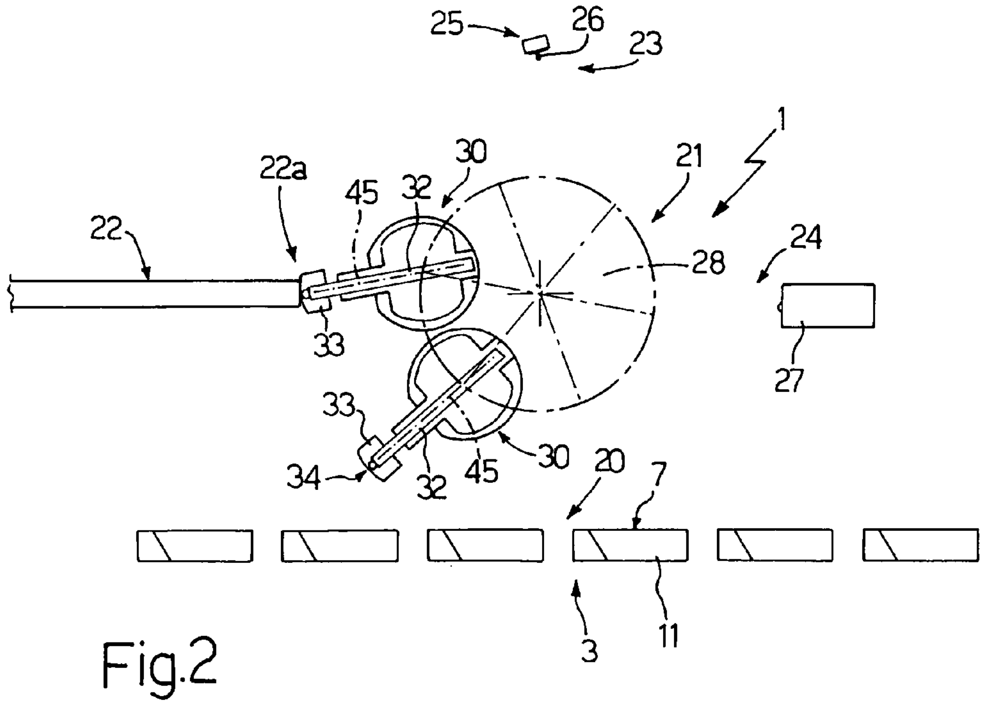

Number 1 in FIG. 1 indicates as a whole a device for applying a label 2 to a packet 3 of cigarettes fed continuously along a conveying path P1 extending in a substantially horizontal direction D1 parallel to the FIG. 1 plane.

Figure 14:
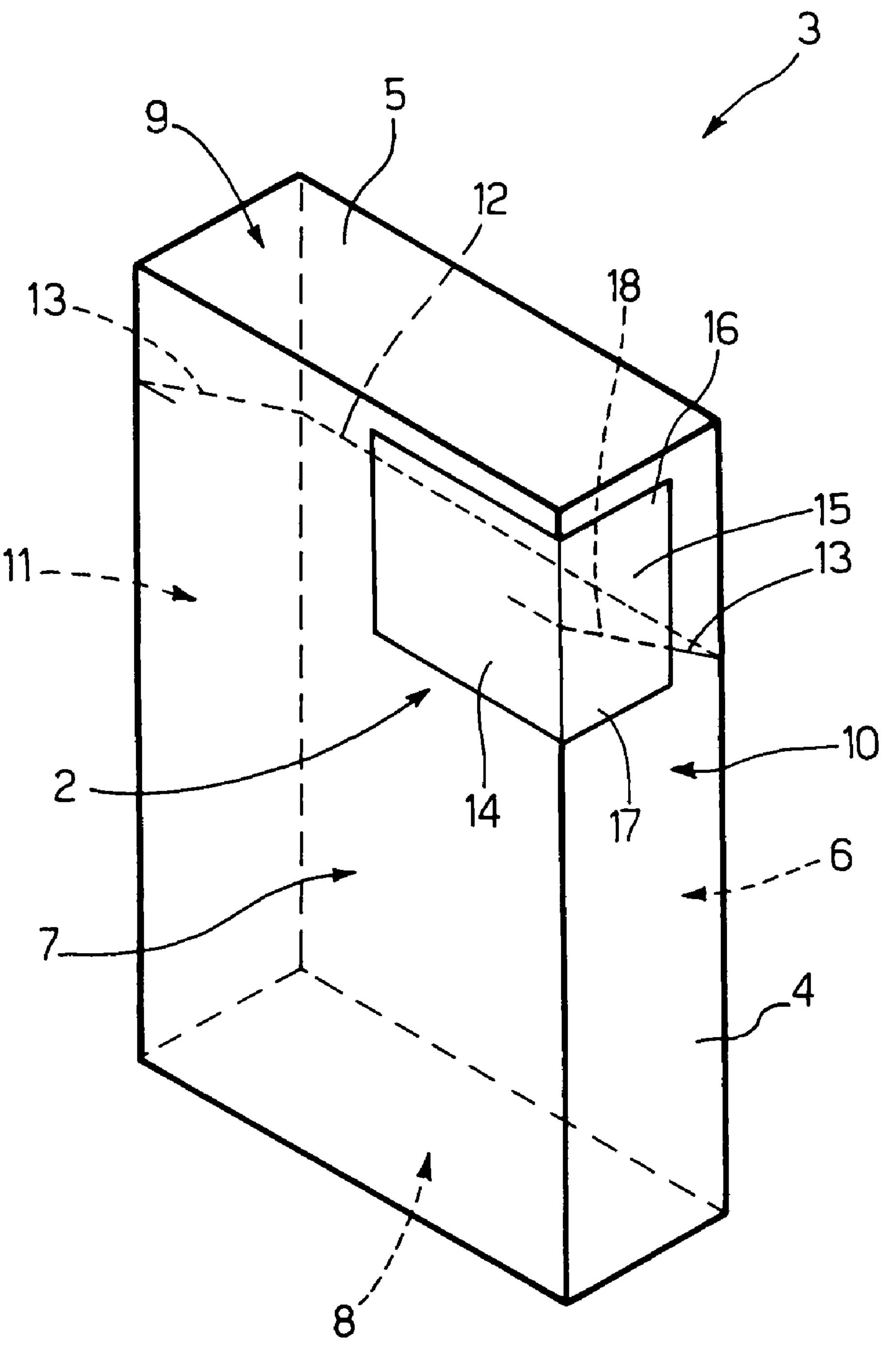
FIG. 14 shows a view in perspective of a packet to which a label has been applied using a method in accordance with the present invention.

With reference to FIG. 14, packet 3 is a rigid, hinged-lid type, comprises a cup-shaped body 4 and a lid 5, and has, once it is applied, a label 2 located partly on lid 5 and partly on cup-shaped body 4. When lid 5 is in the closed position, packet 3 comprises a front face 6, a rear face 7, a bottom face 8, a top face 9, and two lateral faces 10 and 11. Lid 5 and the cup-shaped body are hinged along rear face 7, and are separated by a parting line 12 along front face 6, and by two parting lines 13 along respective lateral faces 10 and 11 label 2 comprises a central portion 14 which adheres to rear ace 7; and a lateral portion 15 which adheres to lateral face 10 and is divided into two portions 16 and 17 by a tear line 18 located at parting line 13.

With reference to FIG. 1, device 1 comprises a conveyor 19 for feeding packet 3 along path Pi and through a labelling station 20 where, in use, label 2 is applied to packet 3. More specifically, packet 3 is conveyed with rear face 7 positioned horizontally and parallel to direction D1, and with lateral face 10 oriented vertically and parallel to direction D1.

Device 1 also comprises a transfer unit 21 for feeding label 2 along a feed path P2 from a store 22 to labelling station 20 via a cutting station 23, where tear line 18 is formed, and then via a gumming station 24, where a layer of gum is applied to label 2.

Store 22 is located at a pickup station 22*a*, and comprises guides and a pusher (known and not shown) for feeding the stacked labels 2 to an outlet of store 22.

Device 1 also comprises a cutting member 25 located at cutting station 23 and having a fixed blade 26 for forming tear line 18 on label 2; and a gumming device 27, which is located at gumming station 24, comprises a spreader having a volumetric pump (known and not shown), and provides for gumming a surface of label 2.

Transfer unit 21 comprises a wheel 28 rotating about a substantially horizontal axis 29 perpendicular to the FIG. 1 plane; and a number of operating assemblies 30—six in the example shown (of which only two are shown in FIGS. 1 to 11)—each fitted to wheel 28 to rotate about a respective axis 31. Each operating assembly 30 comprises a respective sliding arm 32 movable longitudinally in a substantially radial direction with respect to relative axis 31; and a respective pickup head 33 fitted to the opposite end of arm 32 to axis 31, and for engaging label 2 along path P2.

Figure 12:
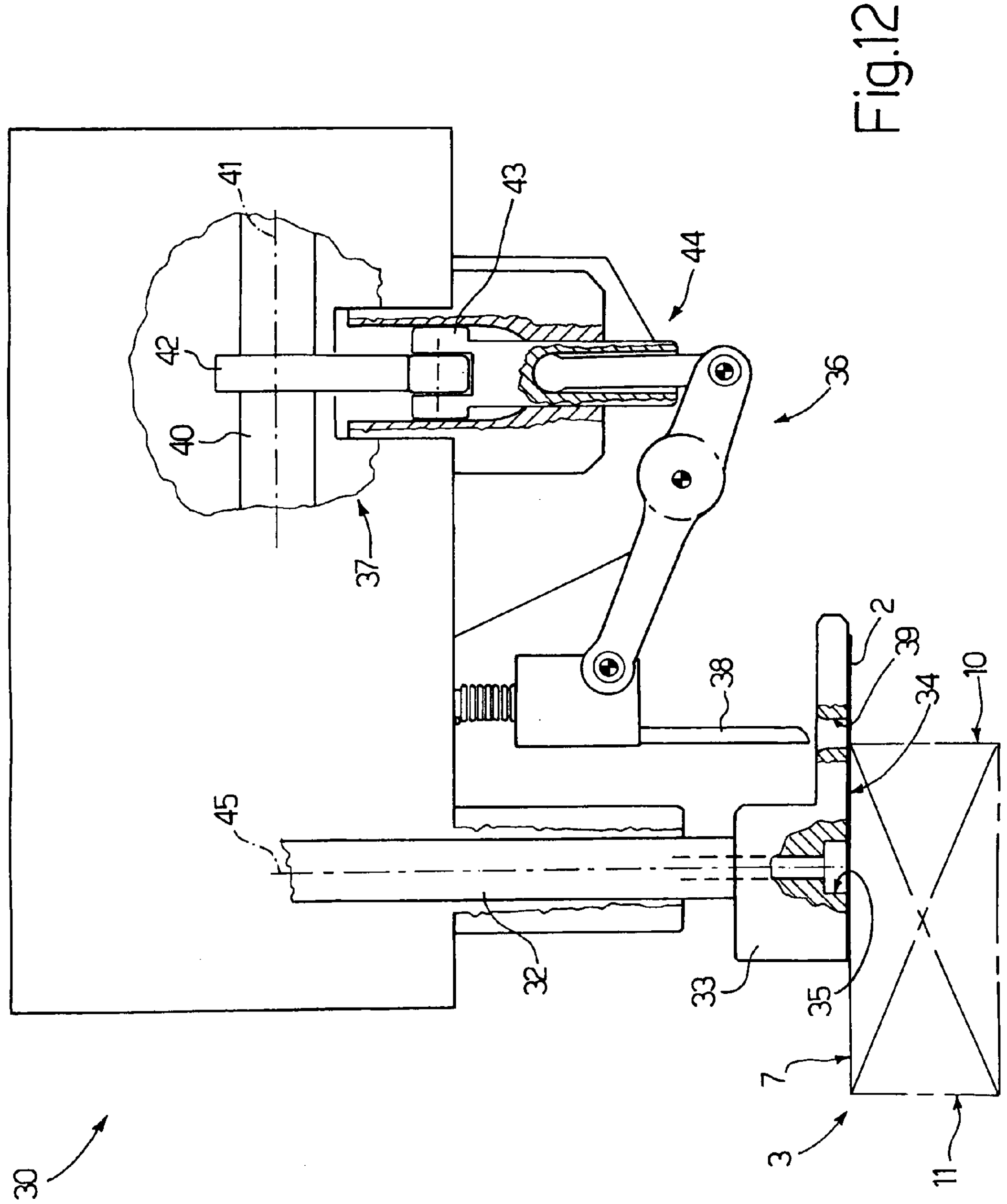
FIGS. 12 and 13 show partly sectioned views of a detail of the above Figures in two successive operating positions.
Figure 13:
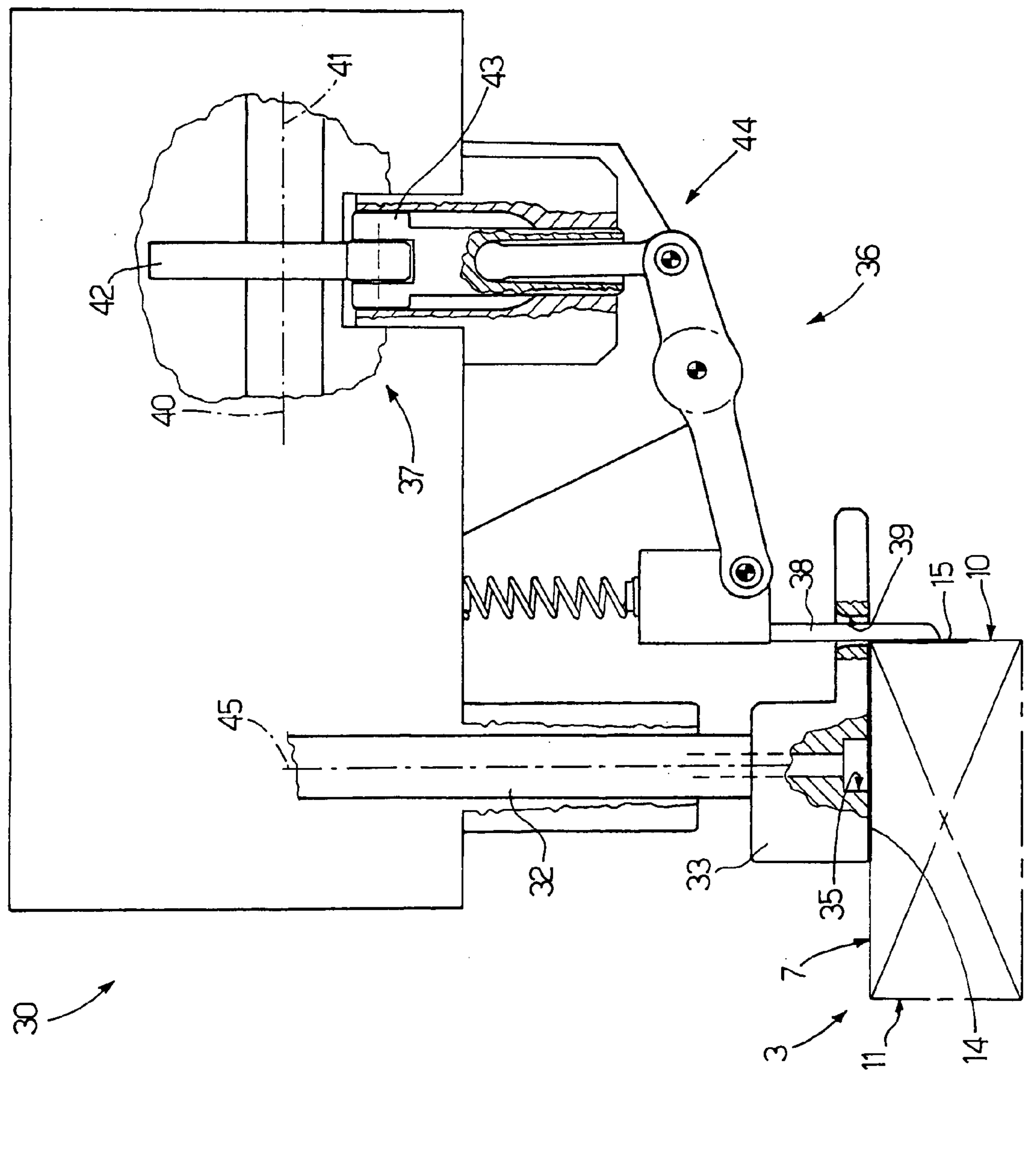

With reference to FIGS. 12 and 13, each pickup head 33 comprises a respective slightly outwardly convex pickup wall 34; and a respective suction hole 35, which is connected to a vacuum source (known and not shown), is formed in pickup wall 34, and provides for keeping label 2 in contact with pickup wall 34. Pickup wall 34 is substantially rectangular to adapt better to the shape of label 2.

Each operating assembly has a respective folding unit 36 for folding lateral portion 15 of label 2 onto lateral face 10 of packet 3. Each folding unit 36 comprises a relative cam system 37 for moving a folding finger 38 between a rest position (FIG. 12) and a work position (FIG. 13) in which folding finger 38 contacts lateral face 10. Folding finger 38 moves between the above two (rest and work) positions through a hole 39 in pickup head 33.

Cam system 37 comprises a transmission shaft 40 rotating about a respective longitudinal axis 41; a contoured disk 42 coaxial and integral with transmission shaft 40; and a slide 43 for following the profile of contoured disk 42. In actual use, slide 43 transmits motion to folding finger 38 via a mechanism 44 comprising two levers and a spring.

Transfer unit 21 comprises an actuating system (not shown) for rotating wheel 28 about axis 29; and a cam mechanism (not shown) for transferring motion from the actuating system (not shown) to each operating assembly 30, so that each operating assembly 30 rotates about respective axis 31, each arm 32 slides radially with respect to relative axis 31, each transmission shaft 40 rotates about respective axis 41, and each pickup head 33 is rotated, by rotation of relative arm 32, about a longitudinal axis 45 of relative arm 32. Axis 45 is substantially perpendicular to pickup wall 34.

Operation of device 1 will be described with reference to one pickup head 33, and as of the instant in which pickup head 33 is located immediately upstream from store 22, so that the longitudinal extension of pickup wall 34 is substantially parallel to axes 29 and 31. At this point, at pickup station 22*a*, pickup wall 34 is brought into contact with the outlet of store 22, and is rolled over the outlet (FIGS. 1 and 2) by rotating pickup head 33 simultaneously about axes 29 and 31, and moving arm 32 radially with respect to axis 31. As pickup wall 34 rolls over the outlet of store 22, suction through suction hole 35 is activated to keep label 2 in contact with pickup wall 34.

Figure 3:
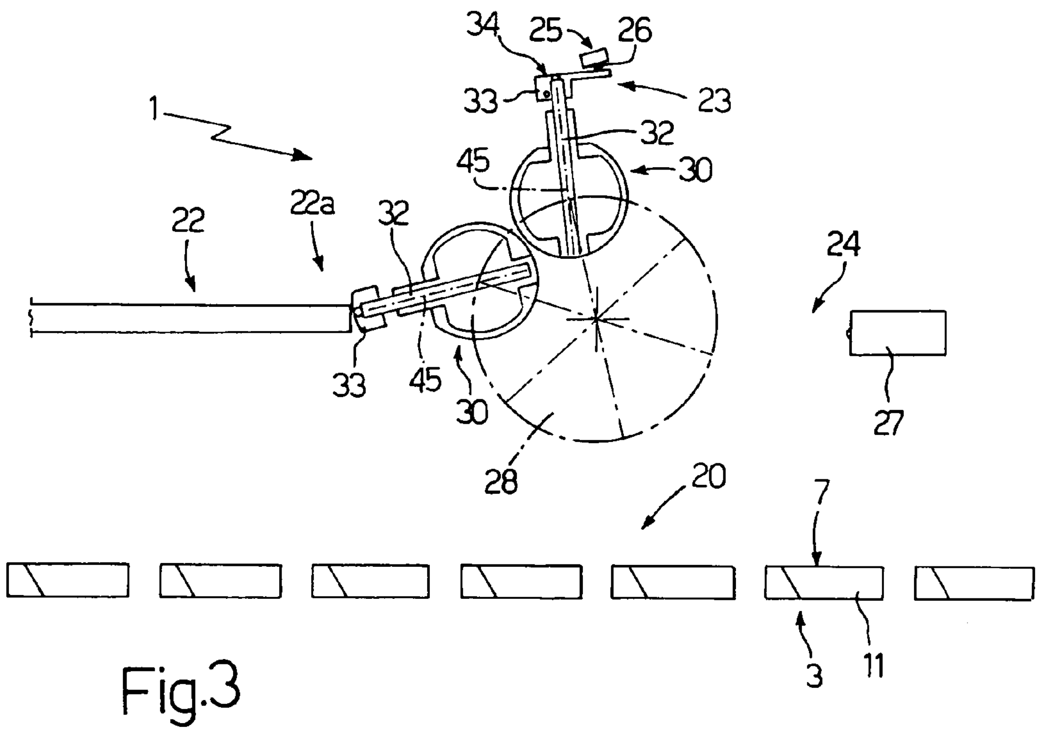
Figure 4:
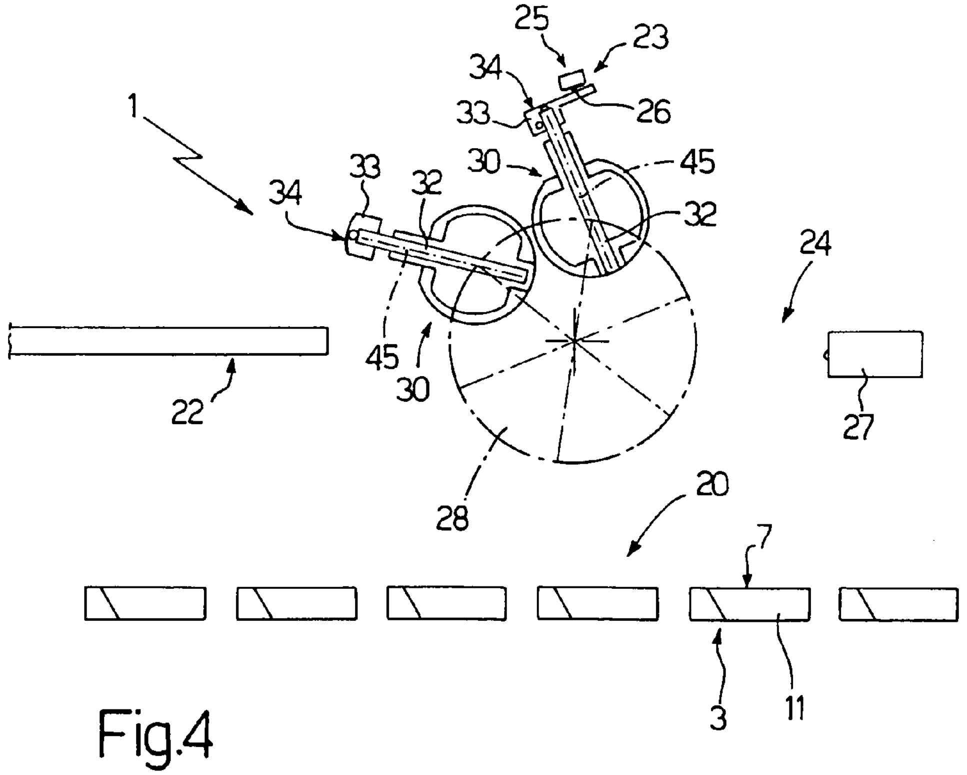

At this point, downstream from store 22 and upstream from cutting station 23, pickup head 33 is rotated roughly 90° about longitudinal axis 45 of arm 32, so that the longitudinal extension of pickup wall 34 is substantially perpendicular to axes 29 and 31 (FIGS. 3 and 4).

Figure 5:
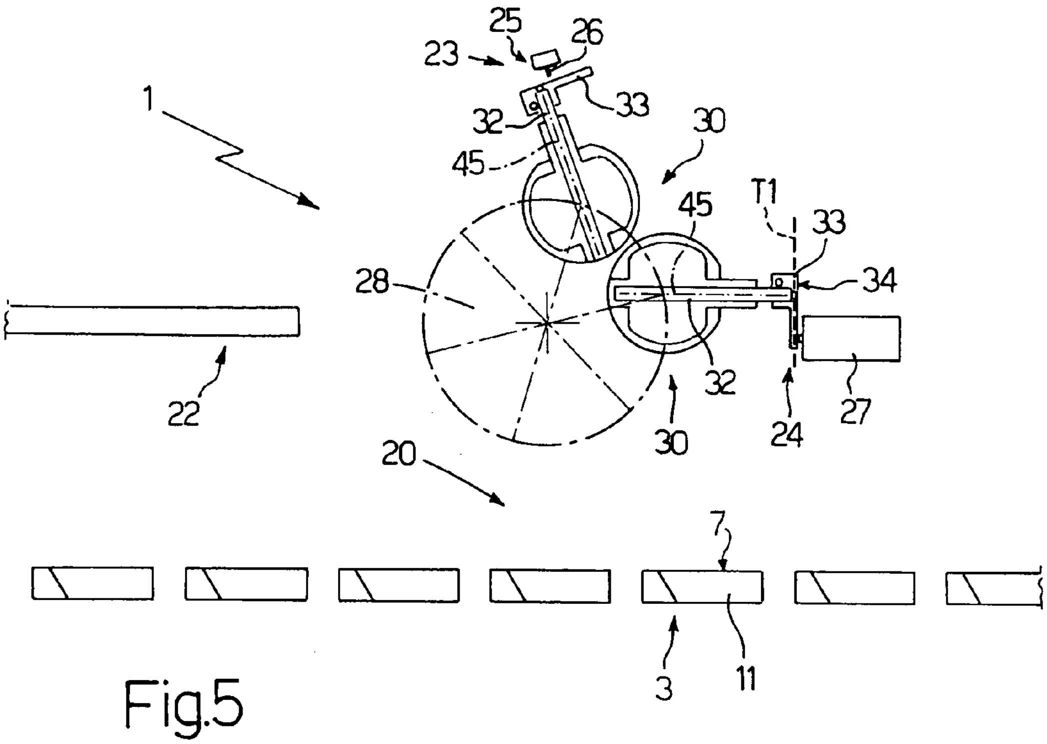
Figure 6:
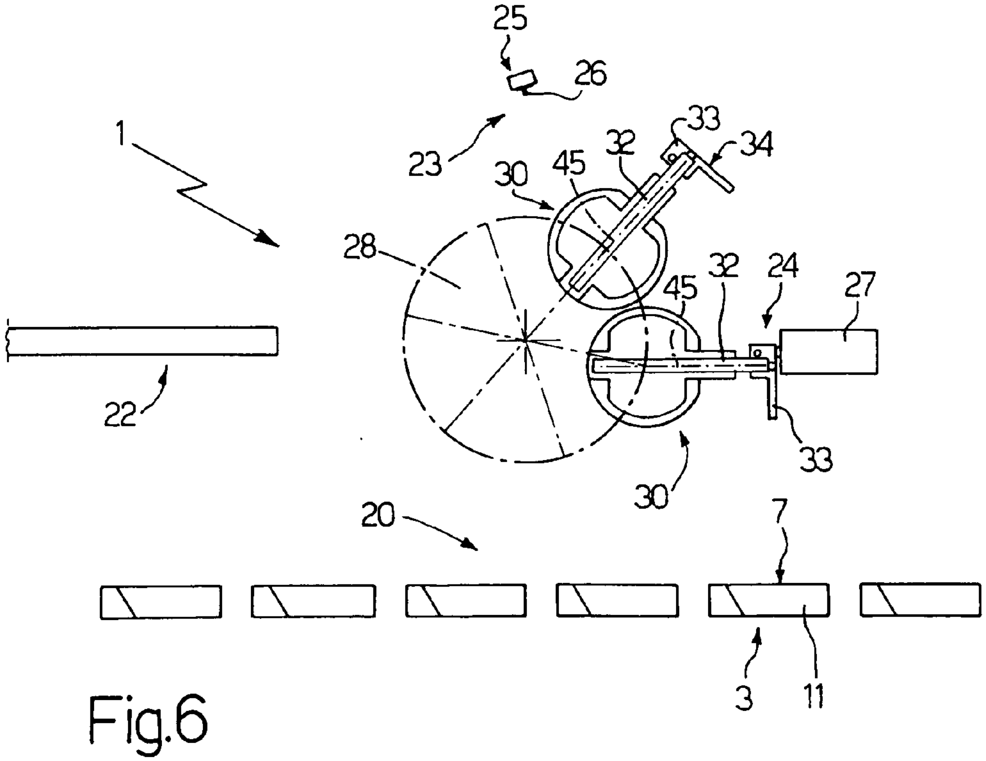

At this point, pickup head 33 is fed through cutting station 23 by being rotated about axes 29 and 31, but with no radial movement with respect to axis 31. And, at cutting station 23, blade 26 forms tear line 18 on label Once tear line 18 is formed, pickup head 33 is fed along a substantially straight portion T1 of feed path P2 through gumming station 24 (FIGS. 5 and 6). Label 2 is maintained substantially parallel to itself along portion T1, and pickup head 33 is fed along portion T1 by rotating pickup head 33 simultaneously about axes 29 and 31, and moving arm 32 radially with respect to axis 31.

At this point, downstream from gumming station 24 and upstream from labelling station 20, the pickup head is rotated roughly 90° about longitudinal axis 45 of arm 32, in the opposite direction to the rotation imparted upstream from cutting station 23, so that the longitudinal extension of pickup wall 34 is substantially parallel to axes 29 and 31.

Figure 7:
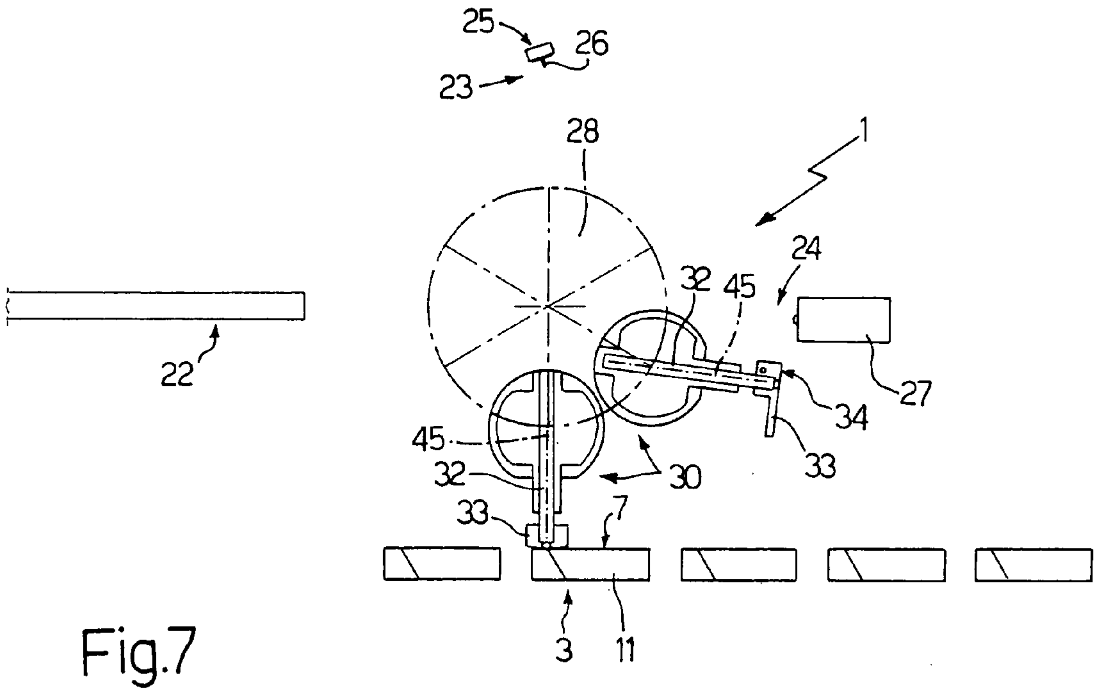
Figure 8:
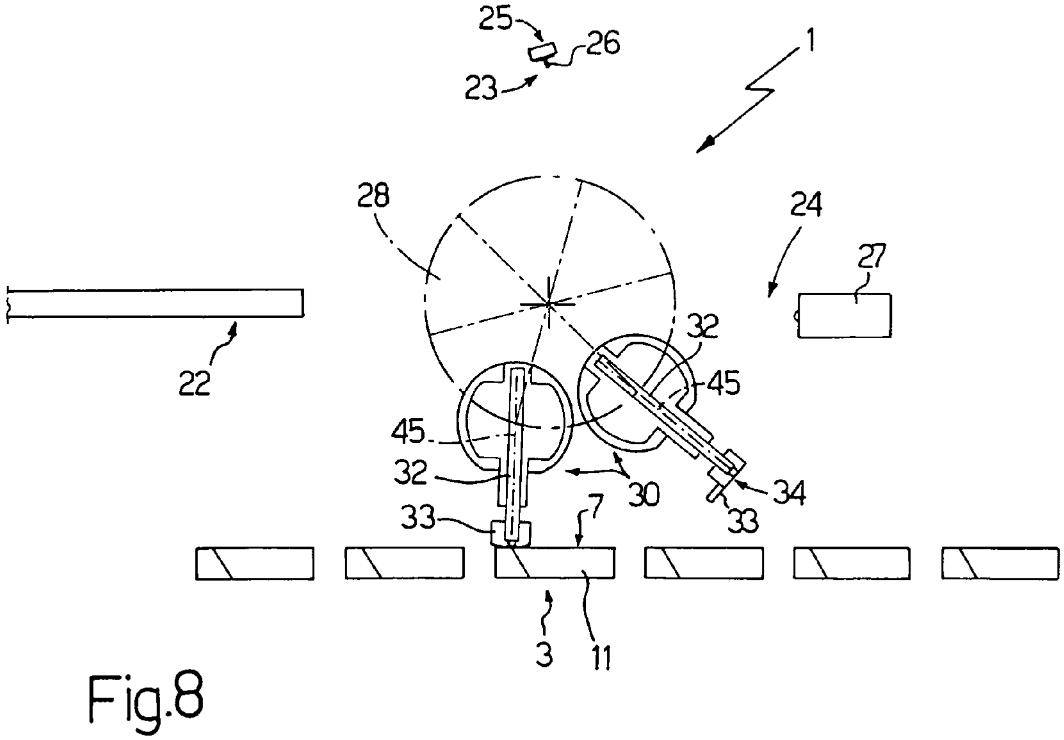

At this point, pickup head 33 is fed through labelling station 20, where pickup wall 34 rolls over the rear face 7 of packet 3 to apply label 2 to face 7 (FIGS. 7 and 8). At labelling station 20, pickup head 33 is fed along a substantially straight portion T2 of feed path P2.

The rolling movement over face 7 is performed by rotating pickup head 33 simultaneously about axes 29 and 31, and moving pickup head 33 radially with respect to axis 31. And, during the rolling movement over face 7, suction through suction hole 35 is deactivated to enable correct application of label 2 on face 7. Also, during the rolling movement, folding finger 38 is moved through hole 39, so that lateral portion 15 of label 2 is brought into contact with lateral face 10 of packet 3.

Figure 9:
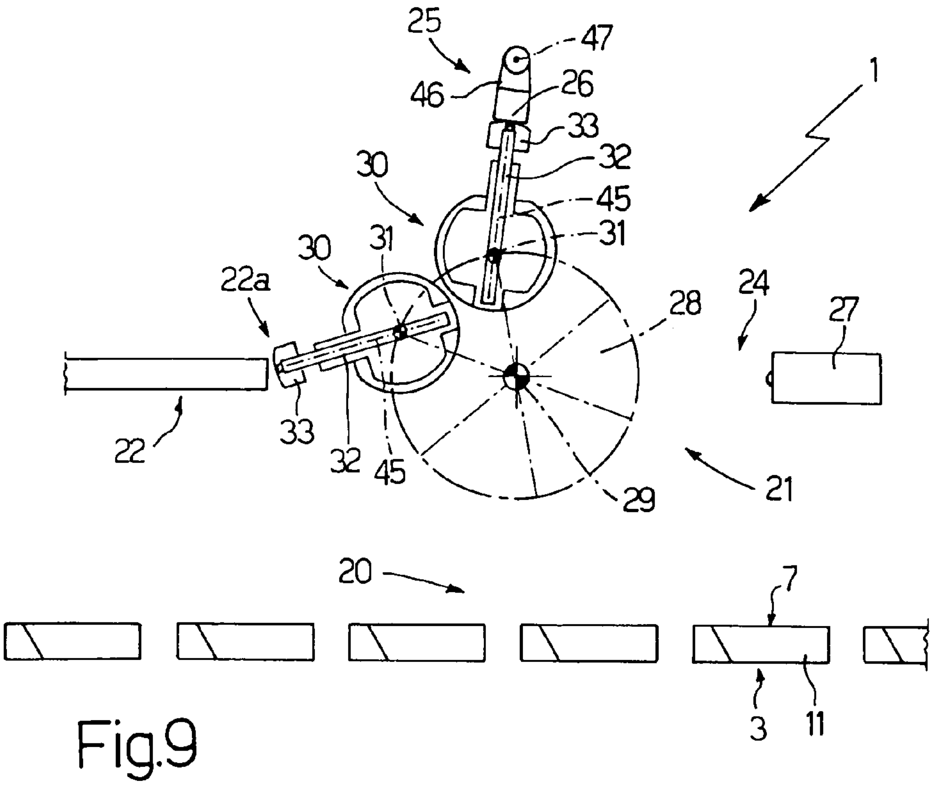
FIGS. 9 to 11 show schematic side views, with parts removed for clarity, of a further embodiment of a device in accordance with the present invention in successive operating positions.
Figure 10:
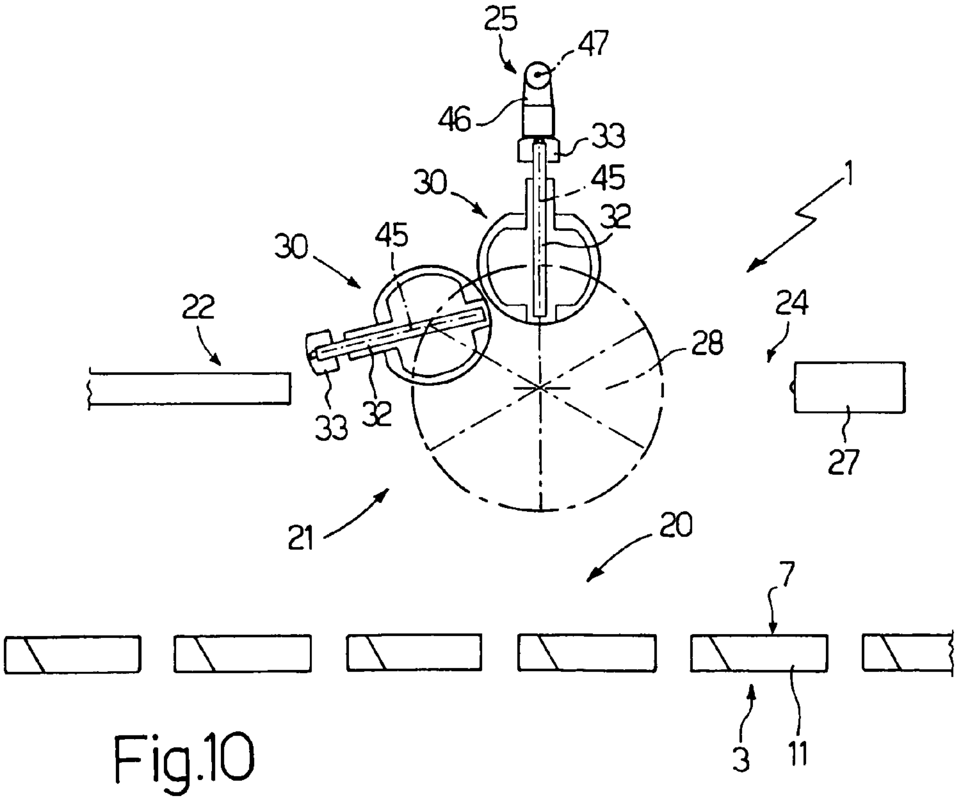
Figure 11:
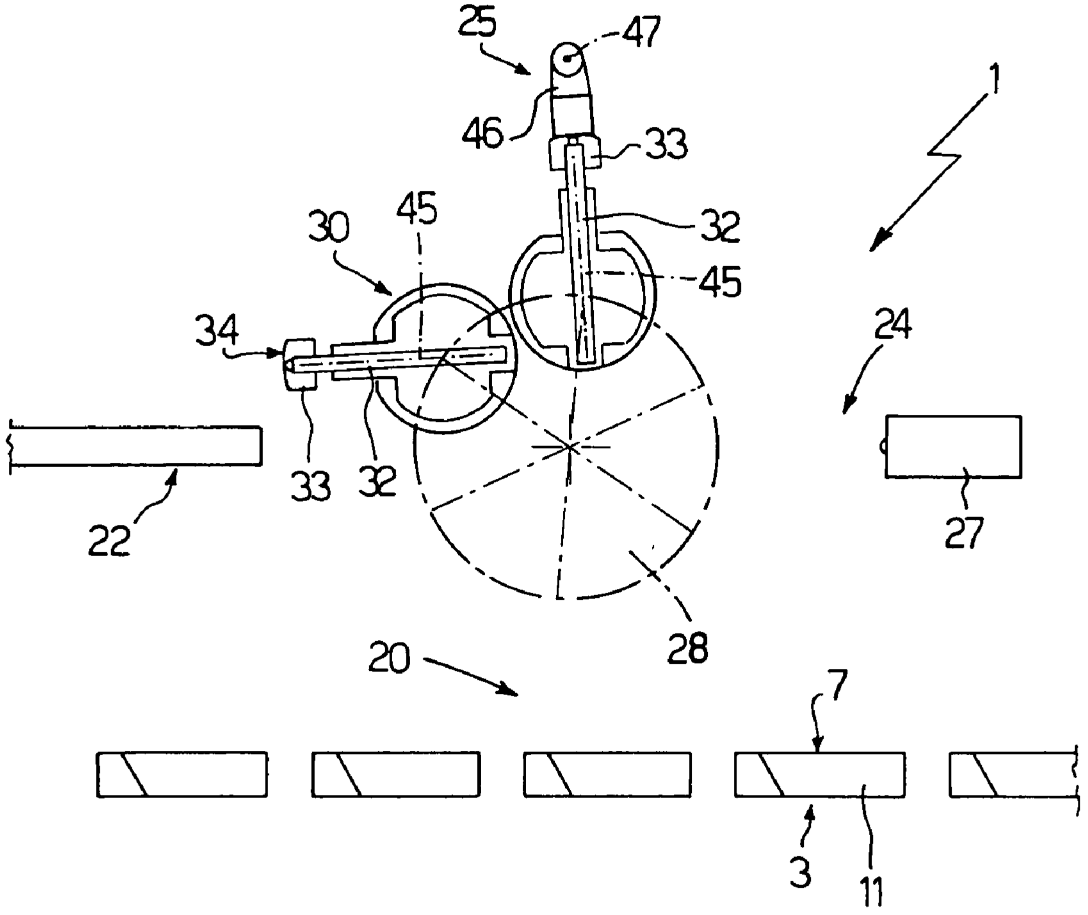

In an alternative embodiment shown in FIGS. 9 to 11, cutting member 25 comprises an actuating system 46 for rotating blade 26 about an axis 47 substantially parallel to axes 29 and 31.

In this case, in actual use, pickup head 33 is rotated simultaneously about axes 29 and 31 and moved radially with respect to axes 31 at cutting station 23, and is rotated about axis 45 downstream from cutting station 23 and upstream from gumming station 24.

In a further embodiment not shown, wheel 28, operating assemblies 30, arms 32, and folding fingers 38 are operated by electric actuators connected to one another to operate in coordination.

In connection with the above, it should be pointed out that device 1 provides for a high degree of precision and maneuvrability throughout all the operating stages, and in particular when withdrawing label 2 from store 22, forming tear line 18, gumming the label, applying label 2 to face 7, and folding lateral portion 15. Moreover, the maneuvrability of pickup head 33 provides for greatly simplifying store 22, cutting member 25, gumming device 27, and conveyor 19.

The invention claimed is:

1. A method of applying a label (2) to a packet (3), the method comprising a step of conveying the packet (3) in a given direction (D1) along a conveying path (P1) and through a labeling station (20);

a pickup step to withdraw the label (2) from a store (22) by means of a pickup head (33); a feed step to feed the pickup head (33) along a feed path (P2) through the labeling station (20); and an application step to apply the label (2) to a first face (7) of the packet (3) at the labeling station (20);

wherein, during the feed step, the pickup head (33) is fed along the feed path (P2) by rotating the pickup head (33) about a first axis (29) and a second axis (31), that is parallel to the first axis (29) and by sliding a supporting element (32), which supports the pickup head (33), linearly with respect to the second axis (31) so as to change a radial distance between the pickup head (33) and the second axis (31) while the second axis rotates about the first axis.

2. A method as claimed in claim 1, wherein said first face (7) is substantially parallel to the given direction (D1).

3. A method as claimed in claim 1, wherein said label (2) comprises a first portion (14) which is applied to said first face (7), and a second portion (15) which is applied to a second face (10) of the packet (3) substantially perpendicular to the first face (7); the method comprising folding the second portion (15) by means of movable folding means (36) associated with the pickup head (33).

4. A method as claimed in claim 3, wherein the second face (10) is substantially parallel to the given direction (D1).

5. A method as claimed in claim 1, wherein the pickup head (33) comprises a pickup wall (34) having gripping means (35), in particular suction means, for keeping the label (2) in contact with the pickup wall (34).

6. A method as claimed in claim 5, wherein the pickup wall (34) is substantially outwardly convex.

7. A method as claimed in claim 6, wherein, during the pickup step, the pickup wall (34) performs a rolling movement over an outlet of the store (22), so that the label (2) is secured to the pickup wall (34); the rolling movement of the pickup wall (34) over the outlet being performed by rotating the pickup head (33) simultaneously about said first and said second axis (29, 31), and by moving the pickup head (33) radially with respect to the second axis (31).

8. A method as claimed in claim 6, wherein, during the application step, at the labelling station (20), the pickup wall (34) performs a rolling movement over the first face (7) of the packet (3), so that the label (2) is applied to the first face (7); the rolling movement of the pickup wall (34) over the first face (7) being performed by rotating the pickup head (33) simultaneously about said first and said second axis (29, 31), and by moving the pickup head (33) radially with respect to the second axis (31).

9. A method as claimed in claim 1, wherein, during the application step, at the labelling station (20), the pickup head (33) is fed along a portion (T2) of the feed path (P2) substantially parallel to said given direction (D1).

10. A method as claimed in claim 1, wherein the pickup head (33) is fed along said feed path (P2) through a cutting station (23) where cutting means (26) form a tear line (18) on the label (2); the pickup head (33) being rotated about said first and said second axis (29, 31) at said cutting station (23).

11. A method as claimed in claim 10, wherein, when forming the tear line (18), the cutting means (26) are rotated about a third axis (47) substantially parallel to said first and said second axis (29, 31); the pickup head (33) being moved radially with respect to the second axis (31) at the cutting station (23).

12. A method as claimed in claim 1, wherein the pickup head (33) is fed along a substantially straight portion (T1) of the feed path (P2) through a gumming station (24), where the label (2) is gummed by gumming means (27); the label (2) being maintained substantially parallel to itself along the substantially straight portion (T1).

13. A method as claimed in claim 1, wherein the pickup head (33), which comprises a pickup wall (34) for engaging the label (2), rotates about a fourth axis (45) substantially perpendicular to the second axis (31) and to said pickup wall (34).

14. A method as claimed in claim 13, wherein a first rotation of ninety degrees in a first rotation direction about the fourth axis (45) is imparted to the pickup head (33) downstream from the store (22) and upstream from the gumming station (24); a second rotation of ninety degrees being imparted downstream from the gumming station (24) and upstream from the labelling station (20).

15. A method as claimed in claim 14, wherein the second rotation of ninety degrees is in a second rotation direction opposite the first rotation direction.

16. A method as claimed in claim 14, wherein the pickup head (33) is fed along the feed path (P2) through a cutting station (23) located downstream from the store (22) and upstream from the gumming station (24); the first rotation being imparted to the pickup head (33) downstream from the store (22) and upstream from the cutting station (23).

17. A method as claimed in claim 1, wherein the supporting element is an arm that slides longitudinally and radially with respect to the second axis during the feed step.

* * * * *